No. 739,961. PATENTED SEPT. 29, 1903.
B. H. WEISKER.
SUBMARINE BUILDING.
APPLICATION FILED JAN. 30, 1903.
NO MODEL. 2 SHEETS—SHEET 1.
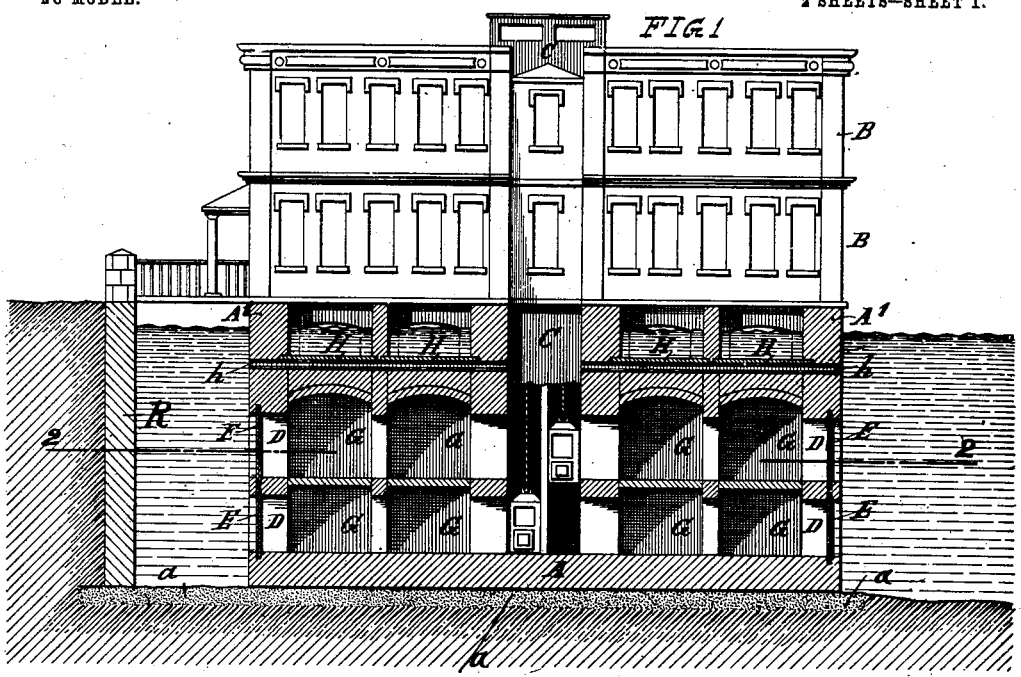
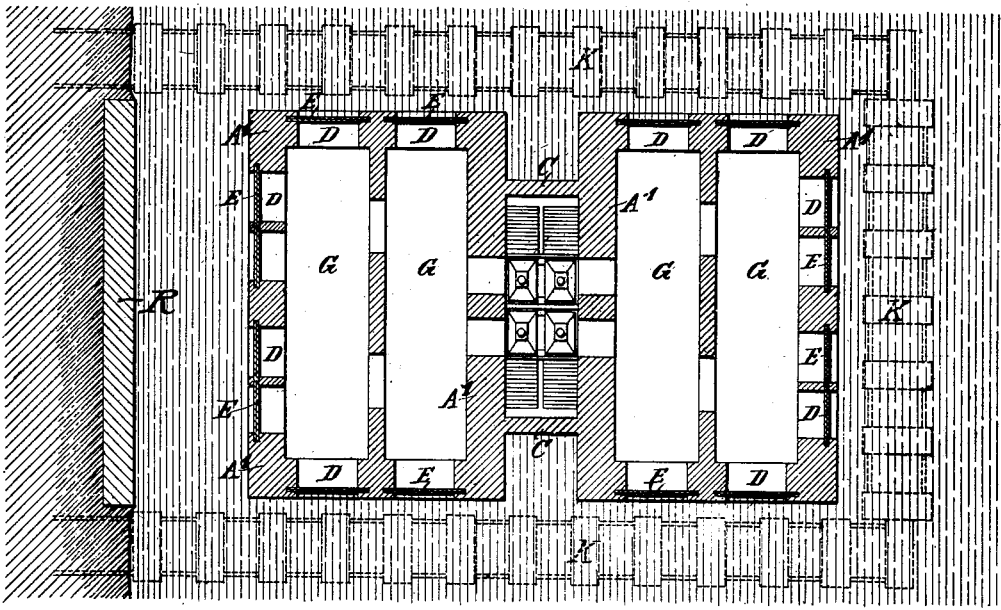
WITNESSES: INVENTOR No. 739,961. PATENTED SEPT. 29, 1903.
B. H. WEISKER.
SUBMARINE BUILDING.
APPLICATION FILED JAN. 30, 1903.
NO MODEL. 2 SHEETS—SHEET 2.
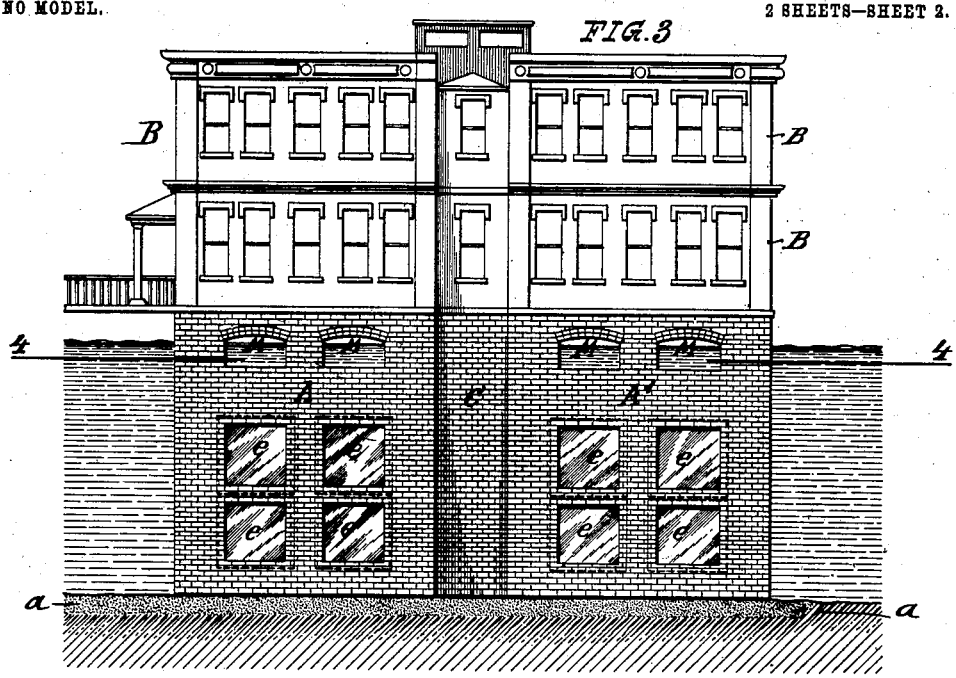
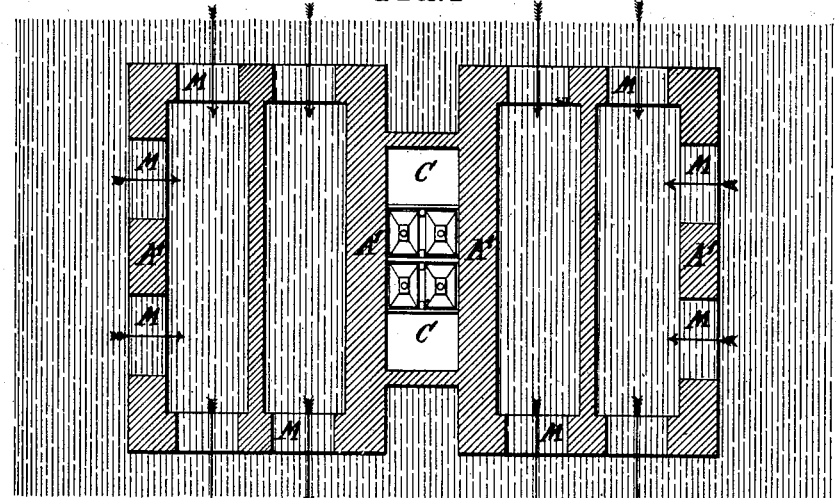
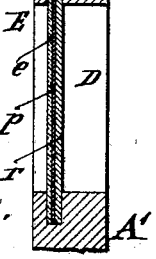
WITNESSES: INVENTOR
Henry J. Suhrbier Bernhard H. Weisker
Conrad Zimmer. by Goerner Viles
his Attorneys No. 739,961.

Patented September 29, 1903.

UNITED STATES PATENT OFFICE.

BERNHARD H. WEISKER, OF NEW YORK, N. Y.

SUBMARINE BUILDING.

SPECIFICATION forming part of Letters Patent No. 739,961, dated September 29, 1903.

Application filed January 30, 1903. Serial No. 141,130. (No model.)

*To all whom it may concern:*

Be it known that I, BERNHARD H. WEISKER, a citizen of the United States, residing in New York, in the borough of Bronx and State of New York, have invented certain new and useful Improvements in Submarine Buildings, of which the following is a specification.

This invention relates to submarine buildings—that is to say, buildings in which the lower portion is below the surface of a body of water, such as a river, lake, or oceanshore, so that the portion under water can be effectually used for restaurants, hospitals, breweries, storage, and other purposes, or below piers, docks, and other structures on the water-front, whereby their storage facilities are considerably enhanced.

The invention consists of a submarine building the foundation and lower stories of which are submerged below the surface of a body of water and separated from the upper stories above the surface of the water by an intermediate or mezzanine story, having openings for the walls of the building being built of stone and cement and the openings in said walls closed by combined glass and metal panels that produce a cooling action on the compartments in the submerged portion of the building.

In the accompanying drawings, Figure 1 represents a side elevation, partly in section, through the lower submerged portion of a submarine building made according to my invention. Fig. 2 is a horizontal section on line 2 2, Fig. 1. Fig. 3 is a side elevation of the upper portion and the lower submerged portion of the submarine building. Fig. 4 is a horizontal section on line 4 4, Fig. 2, through the intermediate or mezzanine floor; and Fig. 5 is a horizontal section through one of the closed openings of the submerged portion, drawn on a larger scale.

Similar letters of reference indicate corresponding parts.

In erecting submarine buildings according to my system a coffer-dam K, of any approved construction and of rectangular shape, is first built from the shore-line into the water of a size larger than the building to be erected, as shown in dotted lines in Fig. 2. After the coffer-dam K is properly filled up and rendered water-tight the body of water at the inside of the same and the shore is pumped out, the necessary earth excavations down to the level of the foundation made, and a retaining-wall R built along the shore-line, as shown in Figs. 1 and 2. The building is then started by laying first a cement bottom $a$, on which a foundation-wall A, of stone and cement or concrete, is laid. In case the nature of the ground should require it the cement and stone bottoms are placed on piles driven into the ground. On this foundation the building proper is erected, the walls A' below the surface of the water being all finished in stone and cement. Between the lowermost stories that are below the level of the water and the uppermost stories that are above the level of the water is interposed an intermediate or mezzanine story which is provided with openings M in its walls, which openings are not closed, so that the water can flow over the floor of the mezzanine story and exert thereby a cooling action on the upper surface of the submerged floors. The walls A' below the mezzanine story are provided with openings D, as many submerged stories G being arranged as the depth of the building below the surface of the water may permit. The openings D are closed by water-tight panels E, which are formed of a pane of glass $e$, an intermediate layer of waterproof lead composition $p$, and a metal plate $r$, all the layers together being of a thickness of from six to eight inches, so that an absolutely water-tight panel E is obtained, through which the temperature of the surrounding water is transmitted to the interior of the submerged stories G, so as to keep them cool in hot weather and comparatively warm during the winter. In other words, the interior floors $h$ are kept always in properly-temperated condition. The submerged stories are connected with the upper stories above the water by means of freight and passenger elevators in any approved manner, said elevators being arranged in a suitable well C.

When the building is entirely completed, the water is admitted to the interior of the coffer-dam and the same removed in sections ready for use for other submarine-building operations. The water then surrounds entirely the submerged stories of the building and keeps the compartments in the same at a uniformly low temperature, so that they can be used for the storage of perishable goods or for industrial purposes—such as breweries, restaurants, and hospitals—as the surrounding body of water, especially at lower depths, has a uniform low temperature throughout the different seasons of the year.

The floor of the intermediate mezzanine story is protected against the entrance of water by a covering H, of glass, lead-cement, and metal $h$, as shown in Fig. 1, which covering extends through the walls of the building, so that the submerged portion of the same is practically surrounded by a body of water at the top and sides, while the bottom, being at a sufficient depth, is held at the same temperature as the surrounding body of water.

Electric light and ventilation for the submerged stories have to be provided, also heating devices, so as to heat up the submerged storage compartments in the winter season, when the surrounding body of water is at too low a temperature. As there is no expense connected with the refrigeration of the submerged stories, they can be used for a variety of storage, preservative, and sanitary purposes.

Having thus described my invention, I claim as new and desire to secure by Letters Patent—

1. A submarine building composed of water-tight submerged stories below the surface of the water, a number of stories above the surface of the water, and an intermediate or mezzanine story having openings for the entrance of the water, separating the lower submerged stories from the upper stories, substantially as set forth.

2. A submarine building, composed of a number of submerged stories formed of water-tight foundations and walls provided with openings closed by water-tight panels, and of a number of stories above the surface of the water, substantially as set forth.

3. A submarine building, consisting of a number of submerged stories formed of a water-tight bottom and side walls provided with openings, panels for closing said openings formed of glass and metal plates cemented together, an intermediate or mezzanine story provided with openings in the walls for permitting the passage of water, a covering of glass and metal plates for the floor of the intermediate story, and a number of stories above the surface of the water, substantially as set forth.

In testimony that I claim the foregoing as my invention I have signed my name in presence of two subscribing witnesses.

BERNHARD H. WEISKER.

Witnesses:
PAUL GOEPEL,
HENRY J. SUHRBIER.